United States Patent [19]

Ward

[11] 4,230,023

[45] Oct. 28, 1980

[54] CLAMPING APPARATUS

[75] Inventor: Charles W. Ward, Akron, Ohio

[73] Assignee: Scovill Manufacturing Company, Waterbury, Conn.

[21] Appl. No.: 857,790

[22] Filed: Dec. 5, 1977

[51] Int. Cl.[3] ........................ F01B 31/12; F16M 13/00

[52] U.S. Cl. ........................................ 92/5 L; 91/275; 200/82 E; 248/500

[58] Field of Search ............... 91/275; 92/164, 5, 169; 248/500, 506, 154; 310/15; 200/82 E

[56] References Cited

U.S. PATENT DOCUMENTS

| | | | |
|---|---|---|---|
| 600,506 | 3/1898 | Blake et al. | 248/500 |
| 625,624 | 5/1899 | Willis | 248/500 |
| 951,007 | 3/1910 | Kirkpatrick | 248/506 |
| 1,543,531 | 6/1925 | Streisel | 248/154 |
| 2,419,942 | 5/1947 | Brewer | 200/81 |
| 2,462,571 | 2/1949 | Thompson et al. . | |
| 3,364,361 | 1/1968 | Burger | 91/275 X |
| 3,483,492 | 12/1969 | Mirbeth | 335/205 |
| 3,639,868 | 2/1972 | Gasper et al. | 335/205 |
| 3,751,866 | 8/1973 | Renchen | 248/500 X |
| 4,019,704 | 4/1977 | Levine | 248/231 X |
| 4,049,166 | 9/1977 | Medlin | 248/500 X |
| 4,071,725 | 1/1978 | Smith et al. | 200/82 E |
| 4,086,456 | 4/1978 | Bone | 200/82 E |

FOREIGN PATENT DOCUMENTS 1120140 7/1968 United Kingdom .

*Primary Examiner*—Irwin C. Cohen

*Attorney, Agent, or Firm*—Price, Heneveld, Huizenga & Cooper

[57] ABSTRACT

This specification discloses a clamping apparatus having an adjustable strap, a clamping member on the strap, means for securing the strap to a first object and means for shortening the effective length of the strap to clamp the first object to another object. In particular, the clamping means is well adapted for use for securing an apparatus which has a proximity sensor to the two tie rods of a fluid cylinder. The clamping means permits easy and secure coupling and longitudinal adjustability of the apparatus with respect to the fluid cylinder.

15 Claims, 5 Drawing Figures

CLAMPING APPARATUS

BACKGROUND OF THE INVENTION (1) Field of the Invention

This invention relates to clamping apparatus; and, more particularly, to an adjustable clamping apparatus for securing one object to another.

(2) Prior Art

It is well known to couple two objects using various clamping means. However, it is more difficult to couple two objects when their relative size can vary and their relative placement need be changed after initial coupling. For example, when an object such as a proximity sensor needs to be attached to a fluid cylinder, it is necessary that the sensing apparatus be secured as closely as possible to the cylinder itself. Prior known structures have included complicated, rigid structures fitting around the body of the cylinder which held the sensor tightly against the cylinder body. Relatively rigid structures have also been used to attach the sensing apparatus to cylinder tie rods. However, since adjustment of the position of the sensors is often necessary when the stroke of the piston within the fluid cylinder must be adjusted, such prior structures have often been difficult to move or adjust. Other structures have fixedly mounted the sensing apparatus at the ends of the cylinder eliminating flexibility necessary for complete utilization of the sensing apparatus.

The present invention overcomes the above problems by providing a clamping apparatus with longitudinal adjustability and ready connection to each of the objects to be coupled. Disassembly of the individual objects being coupled is not necessary. Further, the clamp extending between the two objects can be easily loosened and the two objects repositioned relative to one another before securing the clamping. Thus, the present invention overcomes the above problems by providing, for example, an easy and secure coupling between a sensing apparatus and a fluid cylinder without the necessity of providing additional complicated, rigid structure and without the necessity of disassemblying any portion of the fluid cylinder.

SUMMARY OF THE INVENTION

Accordingly, the present invention provides a clamping structure which allows easy adjustment of the position of one object with respect to another object and yet locates the two objects so they are generally adjacent to or in contact with each other. In particular, the clamping structure is advantageously suited for attaching a sensor to the side of a fluid cylinder.

Generally, the clamping apparatus includes an elongated clamping strap, a contoured clamping member on one end of the strap and an adjustment means coupled to the clamping strap for adjusting the effective length of the strap. Securing means are provided for coupling the adjustment means to an object to be secured to an object engaged by the clamping member.

In a particular embodiment of this invention, the clamping apparatus is adapted to secure the sensing apparatus to two tie rods of a fluid cylinder, the tie rods extending along and spaced outwardly from the exterior surface of the cylinder between support means at the ends of the cylinder. The clamping apparatus includes a clamping arm having two ends. Recess means at one end of the clamping arm are contoured to the shape of and mate with the tie rod for receiving the tie rod and retaining the sensing apparatus on the fluid cylinder. Attaching or securing means are included at the other end of the clamping arm for attaching the clamping arm to the sensing apparatus. Tightening or adjustment means positioned intermediate the ends of the clamping arm for tightening the recess means toward the attaching means are also included whereby the sensing apparatus may be securely clamped to the fluid cylinder and positioned to sense the proximity of a piston within the fluid cylinder.

DESCRIPTION OF THE PREFERRED EMBODIMENT

Figure 1:
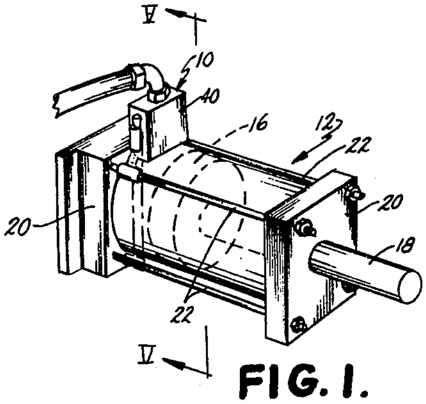
FIG. 1 is a perspective view of a typical fluid cylinder demonstrating a magnetic proximity sensing apparatus secured to a tie rod of the cylinder with the clamping apparatus of the present invention.
Figure 3:
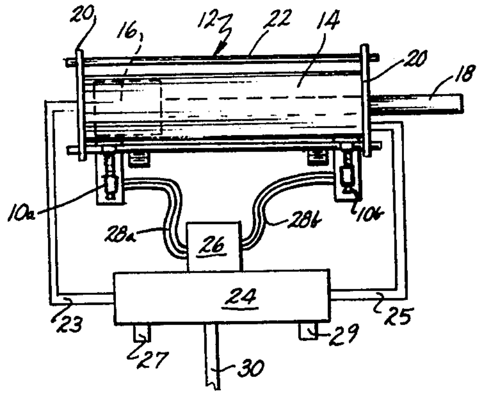
FIG. 3 is a schematic illustration of a pair of the magnetic proximity sensing devices of the present invention secured to a typical fluid motive power cylinder with the present clamping apparatus and connected to control the operation of the cylinder via a solenoid operated fluid valve.

Referring now to the drawings in greater detail, FIGS. 1 and 3 illustrate a magnetic proximity sensing apparatus 10 secured to a fluid motive power cylinder 12 of the pneumatic type with the clamping apparatus of the present invention. Fluid cylinder 12 includes a right circular cylindrical housing 14 preferably formed from a nonmagnetic material such as aluminum or brass including a piston 16 mounted for reciprocal movement therein. Piston 16 is secured to the end of push or connecting rod 18 which extends outwardly of at least one end of the cylinder for movement of an apparatus to be powered by the cylinder. The ends of housings 14 are closed by closure plates 20 which seal the ends of the cylinder to form a fluid tight housing. Suitable sealing structure is included to seal the opening in the one end plate 20 through which the connecting rod 18 extends. Closures 20 are securely held in place by a plurality of tie rods 22, in this case four, which are spaced equally about the circumference of the cylinder and hold the end closures securely against the ends of housing 14. Typically, piston 16 is formed from a ferro-magnetic material such as steel or the like such that it will be magnetically attractable and attract magnets toward it.

As best seen in FIG. 3, operation of the pneumatic fluid cylinder 12 is typically controlled by means of a spool valve 24 or the like. Spool valve 24 in turn is typically operated by an electric solenoid operated pilot valve 26 cooperatingly associated with the spool valve 24. A pair of the magnetic sensing apparatus 10*a* and 10*b* are secured at spaced locations between two of the tie rods 22 supporting the cylinder 12 such that they lie generally tangentially along the side or sides of cylinder housing 14 against or in close proximity thereto. Sensors 10*a* and 10*b* are connected by electrical wires 28*a* and 28*b* to the pilot valve 26 to control insertion and exhaustion of fluid, in this case compressed air, to and from opposite sides of piston 16 for movement thereof.

For example, compressed air inserted through a supply line 30 to spool valve 24 is directed by appropriate conventional valving within the spool valve to fluid conduit 23. Conduit 23 inserts the fluid at the left end of the cylinder against piston 16 (FIG. 3). Simultaneously, fluid conduit 25 on the opposite side of piston 16 is opened via the valving in spool valve 24 to exhaust outlet 29. Pressure against the left end of piston 16 moves the piston to the right in FIG. 1 until it comes within the influence of the magnetic field of the magnet within sensor 10*b* at the right end of the cylinder. Sensor 10*b* senses the position of the piston, signals pilot valve 26 by an electrical wiring 28*b* which closes fluid conduit 25 to halt the rightward movement of the piston. In a similar manner, when piston 16 is moved to the left by compressed air inserted there against through fluid conduit 25 while air is exhausted via outlet 27, sensor 10*a* will sense the presence of piston 16. Thus, location of sensors 10*a* and 10*b* controls the length of stroke of piston 16 within cylinder housing 14.

Figure 2:
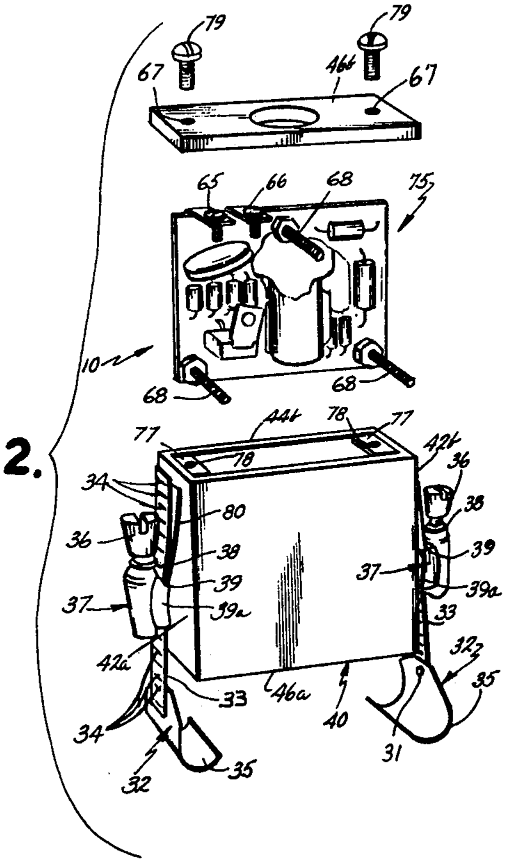
FIG. 2 is an exploded perspective view of a magnetic proximity sensing device with the clamping apparatus of the present invention secured thereto in accordance with an embodiment of this invention.

As shown in FIGS. 1 and 2, magnetic proximity sensing apparatus 10 includes a generally rectangular housing 40 providing a base for supporting the proximity sensor and including generally planar sidewalls 42*a*, 42*b*, generally planar front and back walls 44*a*, 44*b*, a closed bottom end wall 46*a*, and a top end wall 46*b* having an opening 47 therethrough for insertion of electrical wiring. One or more of the sides, top, bottom, or end panels is removably secured by appropriate screws or the like to the other panels for access to the internal mechanism of the sensor. The housing 40 provides a cover to protect the internal mechanism from dust, dirt, and undesired tampering with the mechanism.

FIG. 2 is an exploded view which shows a printed circuit board 75 upon which are mounted the electrical components of sensing apparatus 10. Output terminals 65 and 66 extend from one side of circuit board 75 and electrically connect sensing apparatus 10 to electrical wires (not shown) which would extend through opening 47. A pair of flanges 77 extend inwardly from the top portions of sidewalls 42*a* and 42*b* and each have an opening 78 for receiving a screw 79 extending through an opening 67 in end wall 46*b*. Printed circuit board 75 is positioned within housing 40 and aligned by three spacing posts 68 which extend generally perpendicularly outward from a major surface of circuit board 75 and are secured thereto. After printed circuit board 75 is within housing 40, an epoxy material can be used to encase printed circuit board 75 and fill housing 40 leaving terminals 65 and 66 exposed. The epoxy protects and seals the printed circuit board 75 against the environment and absorbs shocks.

The electrical circuitry mounted on circuit board 75 forms no part of this invention. It is described and claimed in co-pending, commonly assigned application Ser. No. 857,584 entitled SOLID STATE PROXIMITY SWITCH, filed Dec. 5, 1977, invented by Keith Jacob, the disclosure of which is hereby incorporated by reference herein. As is described in Ser. No. 857,584, the circuitry is adapted to close an electrical circuit upon the proximity of a ferro-magnetic mass such as piston 16 in the cylinder shown in FIGS. 1 and 3. Of course, this invention may be used with proximity switches other than magnetic.

In order to properly secure proximity sensing apparatus 10 generally tangentially against the side of cylinder housing 14 (FIGS. 1, 3 and 6), the present invention provides a clamping arm 32 extending from each of two opposing sides of housing 40. Clamping arm 32 includes a bendable, flexible elongated metallic strap 33 having a plurality of transverse openings or slots 34 spaced longitudinally along the length of strap 33. An attachment or securing mount 37 supports a screw 36 and receives strap 33 so that the threads of screw 36 engage the openings or slots 34 of strap 33 thereby longitudinally moving strap 33 when screw 36 is turned. Mount 37 is coupled to the side of housing 40 and contains a receiving opening 38 for receiving screw 36 and an elongated opening 39 for receiving strap 33 (FIG. 5).

Coupled to the bottom extremity of strap 33, away from housing 40, is a rigid, metallic hook or clamp member 35 curved to receive and retain a tie rod 22. The hook or clamp member extends partially around tie rod 22 to engage the surface of the tie rod which faces away from or opposite to housing or base 40 to brace and hold the housing on the cylinder. Hook 35 may be coated with a resilient plastic coating or painted to increase friction and to prevent marring of the tie rods or other object which they engage. The coupling between clamp 35 and strap 33 can be such means as a rivet 31. Rivet 31 will allow rotation between hook 35 and strap 33 depending on its tightness. Strap 33 can be sufficiently long so that it can engage and couple to the tie rods 22 on the same side of cylinder 12 as housing 40 (shown in solid lines in FIGS. 1 and 6) or on the other side of cylinder 12 from housing 40 (shown in phantom in FIGS. 1 and 6).

Figure 4:
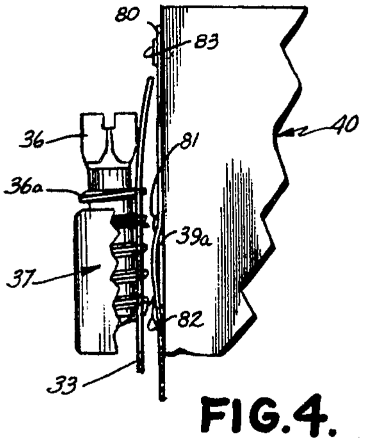
FIG. 4 is a side elevation, partly broken away, view of a portion of the clamping apparatus shown in FIGS. 1 and 2.

Opening 38 has an annular rim which cooperates with a circumferential ridge 36*a* (FIG. 4) around screw 36 to permit turning of screw 36 within mount 37. Thus, the interior of mount 37 is open and not threaded to receive the threaded body of screw 36. However, screw 36 is longitudinally secured with respect to mount 37 by ridge 36*a* and the rim around opening 38 so that turning screw 36 does not move screw 36 up or down but, instead, causes longitudinal movement of strap 33 with respect to mount 37. Mount 37 is punched or formed from a sheet metal so that a curved portion surrounds part of opening 38 and forms the main body portion of mount 37 and an integral flanged portion 39*a* extends around strap 33 and defines elongated opening 39.

Figure 5:
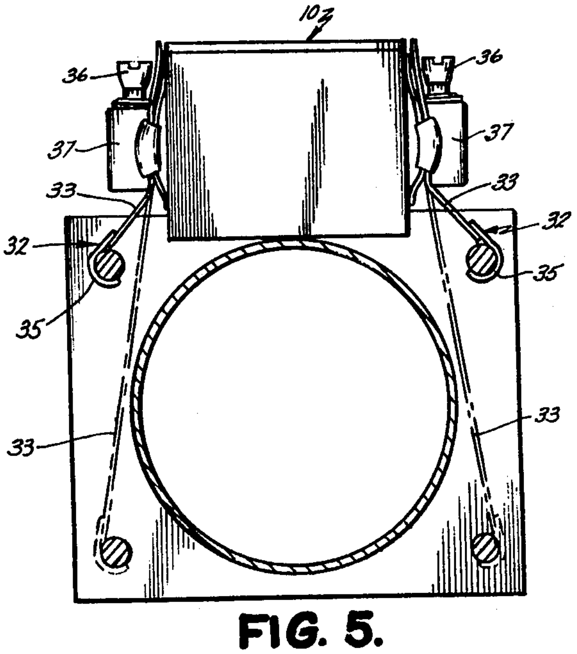
FIG. 5 is an enlarged sectional view of the proximity sensor secured to the fluid cylinder with the clamping apparatus of the present invention taken along plane V—V of FIG. 1.

Referring to FIGS. 2 and 5, the coupling between mount 37 and the side of housing 40 includes an elongated opening 39. A pair of prongs 81 extends upward from flange portion 39*a* adjacent the top edge of opening 39, through an opening in strap 80, and then bends in a reverse direction to secure mount 37 to strap 80. Similarly, a pair of prongs 82 extends downward from flange portion 39*a* adjacent the bottom edge of opening 39 through openings in strap 80, and then bend in a reverse direction. As a result, strap 80 is secured to mount 37 by prongs 81 and 82. Strap 80 is secured to the side of housing 40 by a rivet 83 going through strap 80 into housing 40. Hence, mounts 37 are secured to each side of housing 40 to allow adjustment of the effective length of straps 33. Clamping arm 32 allows sensing apparatus 10 to be secured to cylinder 12 as described without disassembly by simply loosening screws 36, positioning clamps 35 around tie rods 22 and thereafter tightening screws 36. The position of the sensing apparatus 10 may be adjusted along the length of the cylinder 12 merely by loosening screws 36, sliding the apparatus to the desired position, and retightening screws 36. Although two clamping arms, one on either side of housing 40, are preferred, sensor 10 can be clampled to the fluid cylinder or another device by only one clamping arm if strap 33 is sufficiently rigid.

While one form of the invention has been shown and described, other forms will now be apparent to those skilled in the art. Therefore, it will be understood that the embodiment shown in the drawings and described above is merely for illustrative purposes and is not intended to limit the scope of the invention which is defined by the claims which follow.

The embodiments of this invention in which an exclusive property or privilege is claimed are defined as follows:

1. In combination, a first object a second object, and a clamping apparatus for securing the first object to said second object, said clamping apparatus comprising:

- an elongated, flexible clamping strap having a plurality of spaced, generally transverse slots therethrough;
- a clamp member connected to a free end of said clamping strap and contoured to the shape of the second object for positive, secure engagement with the second object;
- an adjustment means coupled to said clamping strap for moving said clamping strap in the direction of elongation of said strap to adjust the effective length of said clamping strap between the first and second objects; said adjustment means including a screw with threads engaging said transverse slots of said clamping strap, a mount with an opening securing said screw therein; and an elongated slot in communication with said opening and receiving said clamping strap therein, so that turning said screw causes longitudinal movement of said clamping strap within said slot thereby changing the effective length of said clamping strap between said mount and said clamp member; and
- securing means coupling said adjustment means to the first object, said securing means including an elongated strap separate from said clamping strap, said separate elongated strap having first and second ends, permanent securement means for permanently fastening said first end to the exterior of said first object, said mount with said screw including flange means for fixedly securing said mount in a predetermined position at said second end of said separate elongated strap whereby when said clamp member is engaged with the second object, said clamping strap can be tightened or loosened by manipulation of the adjustment means to clamp the first object to or release the first object from the second object.

2. Clamping apparatus as recited in claim 1 wherein said separate elongated strap is positioned within said elongated slot adjacent said clamping strap on the opposite side from said screw, and said mount has attachment means including said flange means extending from said mount to said separate elongated strap for attaching said separate elongated strap to said mount.

3. Clamping apparatus as recited in claim 2 wherein said separate elongated strap has a transverse opening and said flange means includes prongs extending from said mount into said transverse opening of said separate elongated strap.

4. Clamping apparatus as recited in claim 1 wherein said clamping member is a rigid hook and is adapted to extend around at least a portion of the second object to engage a surface of the second object which faces away from the first object when said apparatus is secured to the first object.

5. In combination, a proximity device and an improved clamping apparatus for securing the proximity device having a base for supporting said device to a fluid cylinder, the fluid cylinder having tie rods extending along and spaced outwardly from the exterior surface of the cylinder and a piston mounted for movement within the cylinder, the improvement comprising said clamping apparatus including a pair of spaced, clamping arms each comprising an elongated strap having a plurality of equally spaced transverse slots therein, a clamp member at a free end of each arm and contoured to the shape of the tie rod for engaging and receiving one of the tie rods and retaining the apparatus on the fluid cylinder; attaching means at the other end of each of said clamping arms for attaching said clamping arms to said base; and tightening means including a screw with threads engaging said slots and positioned intermediate the ends of each of said clamping arms for shortening the effective length of said clamping arms thereby tightening said clamp members on said clamping arms toward said base so that said proximity device is securely clamped to the fluid cylinder in a position to sense the proximity of the piston within the fluid cylinder.

6. The improved clamping apparatus as recited in claim 5 wherein said attaching means has a first opening for receiving said screw and a second opening for receiving said strap, said first and second openings being in communication with one another and positioned so that the threads of said screw engage said slots, said first opening receiving said screw so that said screw can turn in said opening without being longitudinally displaced with respect to said first opening.

7. The improved clamping apparatus as recited in claim 6 wherein said attaching means includes a mount with said first opening and said second opening and an elongated securing strap extending into said second opening and permanently attached to said mount, said securing strap being attached to said base thereby connecting said clamping apparatus to said proximity apparatus.

8. The improved clamping apparatus as recited in claim 7 wherein each side of said base is connected to one of said securing straps, one of said attaching means is connected to each of the securing straps, one of said clamping arms is coupled to each of said attaching means, and one of said clamp members is connected to each of said clamping arms so that said clamp members each are contoured to be coupled to a tie rod and secure the proximity apparatus to the cylinder.

9. The improved clamping apparatus as recited in claim 8 wherein said base is a generally rectangular housing having therein electrical circuitry for said proximity apparatus and said securing straps are connected to opposing sides of said housing by a pair of rivets, one rivet extending through each of said securing straps into said housing.

10. Clamping apparatus as recited in claim 5 wherein:

- each clamping member comprises a hook shaped to catch onto and detachably engage one of said tie rods on opposing sides of the cylinder, whereby said proximity device is slideable along said cylinder to various locations thereon without completely disassembling said device from the cylinder.

11. Clamping apparatus as recited in claim 10 wherein:

said cylinder includes at least two sets of tie rods on each side thereof; and each strap is flexible, whereby each hook is engageable with either one of the tie rods in the associated set.

12. Clamping apparatus as recited in claim 11 including means for rotatably connecting said hook with said strap for self-alignment therebetween.

13. In combination, a base and an improved clamping apparatus for securing the base to another object, the improvement comprising: said clamping apparatus including a pair of spaced, clamping arms, each clamping arm having a flexible, elongate strap with a plurality of equally spaced slots therein, a clamp member at one end of each arm and contoured to the shape of said other object for engaging and receiving said other object and retaining the apparatus on said other object; attaching means at the other end of each of said clamping arms for attaching said clamping arm to opposed portions of said base, said attaching means including an elongated strap separate from said elongate strap, said separate elongated strap having first and second ends, permanent securement means for permanently fastening said first end to the exterior of said base; and tightening means positioned intermediate the ends of each of said clamping arms for shortening the effective length of said clamping arms, said tightening means including a securing mount having a screw-receiving opening and flange means for fixing said mount in a predetermined position at said second end of said separate elongated strap and a screw with threads for engaging the slots, said screw being confined against longitudinal movement but allowed to rotate within said screw-receiving opening whereby tightening said clamp members on said clamping arms toward said base with said tightening means clamps said base to said other object.

14. The improved clamping apparatus as recited in claim 13 wherein said securing mount also includes a second opening for receiving said flexible elongate strap, said screw-receiving opening and said second opening being in communication with one another and positioned so that the threads of said screw engage said slots.

15. The improved clamping apparatus as recited in claim 14 wherein each side of said base is permanently connected to one of said separate elongated straps, one of said clamping arms being coupled to each of said separate elongated straps by one of said securing mounts and one of said clamp members being connected to each of said clamping arms.

* * * * *

UNITED STATES PATENT AND TRADEMARK OFFICE

CERTIFICATE OF CORRECTION

PATENT NO. : 4,230,023

DATED : October 28, 1980

INVENTOR(S) : Charles W. Ward

It is certified that error appears in the above—identified patent and that said Letters Patent is hereby corrected as shown below:

Column 5, line 19, Claim 1:

After "first object" insert -- , --.

Signed and Sealed this

***Seventh* Day of *April 1981***

[SEAL]

*Attest:*

RENE D. TEGTMEYER

*Attesting Officer* *Acting Commissioner of Patents and Trademarks*